(12) United States Patent
Watanabe et al.

(10) Patent No.: US 6,263,112 B1
(45) Date of Patent: *Jul. 17, 2001

(54) MOTION VECTOR SEARCHING APPARATUS AND MOTION PICTURE CODING APPARATUS

(75) Inventors: Hideaki Watanabe; Kiyoshi Sakai, both of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,111

(22) Filed: May 30, 1997

(30) Foreign Application Priority Data

Dec. 13, 1996 (JP) .................................................. 8-334305

(51) Int. Cl.[7] ........................................................ G06K 9/36
(52) U.S. Cl. ................................................................ 382/236
(58) Field of Search .................................. 382/232, 236, 382/238, 240, 248, 250; 348/384, 394–395, 400–404, 407–416, 420–421, 425, 430–431, 699

(56) References Cited

U.S. PATENT DOCUMENTS 5,083,202 * 1/1992 Parke ................................... 348/416
5,598,483 * 1/1997 Purcell et al. ...................... 382/232
5,699,460 * 12/1997 Kopet et al. ........................ 382/232
5,724,446 * 3/1998 Liu et al. ............................ 382/233
5,778,099 * 7/1998 Suzuki ................................ 382/239
5,778,102 * 7/1998 Sandford, II et al. ............... 382/239

FOREIGN PATENT DOCUMENTS 0 309 251    3/1989  (EP) ............................... H04N/7/137
8-009385     1/1996  (JP) ................................ H04N/7/32
95/04432     2/1995  (WO) .............................. H04N/7/32

OTHER PUBLICATIONS

S. Kozu, et al., "A New Technique for Block–Based Motion Compensation", *IEEE*, 1994, pp. V–217–V220.

E. Tzeng, et al., "An Efficient Memory Architecture for Motion Estimation Processor Design", *IEEE*, 1995, pp. 712–715.

* cited by examiner

*Primary Examiner*—Jose L. Couso
(74) *Attorney, Agent, or Firm*—Staas & Halsey LLP

(57) ABSTRACT

A motion vector data storage device (e.g., a memory) for storing motion vector data is newly provided for reducing a quantity of reference picture data to be read from a frame memory when searching a motion vector. A forward motion vector search used for a forward prediction in a vector searching process for coding a B-picture is performed asynchronously with a coding process, and accessing to the frame memory is thereby dispersed. Data for narrowing down a motion vector search range in a P-picture can be obtained at the same time.

7 Claims, 18 Drawing Sheets

MOTION VECTOR SEARCHING APPARATUS AND MOTION PICTURE CODING APPARATUS

BACKGROUND OF THE INVENTION

The present invention relates to a motion vector search in predictive coding of a digital picture.

An inter-frame predictive coding may be given as a method of reducing data by making use of time-base directional redundancy of a motion picture among methods of compressing a data quantity of motion picture data. According to MPEG-½ defined as an international standardizing system for digital motion picture coding, both of a forward prediction and a bidirectional prediction can be availed.

Forward Prediction

As shown in FIG. 1, a motion between a frame in the past and a frame at present is detected as a forward motion vector, and the frame at present is generated referring to the frame in the past (FIG. 1). This motion vector searching is done by a macroblock consisting of, e.g., 16×16 pixels. A difference in terms of a spatial position from an area exhibiting a largest correlation with respect to a frame with a prediction effected in the forward reference frame, is detected as a motion vector.

Bidirectional Prediction

As shown in FIG. 2, according to a bidirectional prediction, the present frame is generated referring to both or one of the past frame and the prospective frame.

According to these predictive systems, the motion is sought in every area consisting of a plurality of pixels, and a quantity of data for coding the motion in every area as vector data instead of the pixel data can be remarkably reduced. If there is a difference between an original picture and a picture (a predictive picture) composed by use of the motion vectors, data about this difference is coded together with the vector data. Namely, a larger quantity of data can be reduced as the difference between the predictive picture and the original picture becomes smaller. If a motion vector search range is the same, the bidirectional prediction exhibits a higher possibility that a reference picture approximate to the picture serving as a prediction target than by the forward prediction, and hence generally a predictive efficiency becomes higher by using the bidirectional prediction than by the forward prediction. Hereinafter, a frame that can be generated without any data about front and rear pictures, is termed an I-picture (Intra Coded Picture). A frame coded by use of the only forward prediction from past picture is referrd to as a P-picture. (Predictive Coded Picture). A frame coded by use of the forward/backward bidirectional predictions from past/prospective pictures is called a B-picture. (Bidirectionally Predictive Coded Picture).

In general, the motion vector search is attained by sectioning the original picture into a plurality of areas on the coding basis, comparing these areas with a reference picture while being shifted pixelwise in parallel in the horizontal and vertical directions, and thereby seeking a position having the highest correlation. A range for shifting the picture in parallel to obtain the degree of correlation is limited by a performance of transferring the data between a processor for calculating the degree of correlation and the frame memory for storing the reference picture. FIG. 7 is a block diagram illustrating a construction of the coding apparatus using a conventional vector searching method, and FIG. 9 is a flowchart thereof. Further, FIG. 3 shows an example of a coding sequence and the conventional motion vector search.

Referring to FIG. 7, normally a frame memory 71 is so used as to be sectioned into an area 71a used for inputting pictures, an area 71b for storing a coding target picture, an area 71c for storing a forward reference picture, and an area 71d for storing a backward reference picture. A degree-of-correlation calculating unit 72 performs a motion vector search. This degree-of-correlation calculating unit 72, upon inputting coded area data of a coding target picture, designates areas for the forward reference picture and the backward reference picture, and there are inputted pixel data of the reference areas from these reference pictures.

Herein, when coding the P-picture, the data inputted to the degree-of-correlation calculating unit 72 are only pixel data (71b) of the area becoming a coding target of the original picture, and pixel data (71c) of the reference range of the forward reference picture. Further, when coding the B-picture, the reference picture turns out to be the pixel data (71c, 71d) in both of the forward and backward reference ranges.

Then, the degree-of-correlation calculating unit 72 outputs, to a coding unit 73, the forward motion vector in the case of coding the P-picture, and the forward and backward motion vectors in the case of coding the B-picture. The coding unit 73 generates the reference picture with reference to a local decode picture frame memory 74 on the basis of these pieces of vector data, and executes inter-frame predictive coding. The thus coded picture is simultaneously decoded and recorded in the local decode picture frame memory 74 so as to be used as a reference picture thereafter.

FIG. 9 shows a processing flow in the coding apparatus shown in FIG. 7. At first, when determining a picture type, e.g., I-picture coding, P-picture coding or B-picture coding (901), there must be a standby status till the required picture data are inputted to the frame memory 71 (902). Upon inputting the picture data, the picture data of the coding target area is extracted out (903), and the processing is diverged depending on the kinds (the I-picture, or the P-picture, or the B-picture) of the relevant picture data (904, 905). More specifically, in the case of the I-picture, the processing moves directly to a coding step (909). In the case of the P-picture, the motion vector search is executed with the I-or P-picture just anterior serving as a reference frame (908), and thereafter the coding step is implemented, (909). Furthermore, in the case of the B-picture, the motion vector search is effected with the I- or P-picture just anterior serving as a forward reference frame (906). Moreover, the motion vector search is carried out with the I- or P-picture just poterior serving as a backward refernce frame (907), and thereafter the coding process is executed.

A series of processes discussed so far are repeated per picture (910).

FIG. 3 is a sequence diagram on the assumption that a single frame to which the bidirectional prediction is applied is provided behind the frame to which the forward prediction is applied.

Referring to FIG. 3, the coding process is executed by use of a frame memory composed of five areas, an interval for inputting each frame is fixed according to the general video signal specifications, and an interval for coding each frame is also fixed. Therefore, for example, a time I and a time II in the coding process are equal to each other.

Because of the necessity for coding a prospective frame in advance in order to effect the bidirectional prediction, an input sequence of the picture data is different from a coding sequence. The five areas of the frame memory are needed for rearranging this processing sequence.

As shown in FIG. 3, according to the prior art, the motion vector search is implemented just before coding irrespective of the forward/bidirectional predictions. It was a general practice that a P1 motion vector search (P1f) and the coding process are executed for the time I, while B2 bidirectional motion vector searches (B2f, B2b) are performed for the time II.

By the way, a plurality of frame memories are constructed typically of inexpensive DRAMs in order to process a large quantity of data when dealing with the picture data. In this case, it follows that the plurality of frame memories share a single line of data bus. Further, a reduction in costs for manufacturing the motion vector search modules entails decreasing the number of data I/O terminals for the frame memories. If the plurality of frame memories share the I/O terminals, however, a degree of freedom of accessing to the frame memory is restricted because of a conflict of accessing, and hence, when the number of terminals is excessively decreased, the quantity of transferable data can not be secured.

Moreover, the data quantity transferrable per unit time is restricted due to a limit in terms of data write/read speeds of the memory device.

On the other hand, it is required for surely searching the motion vector that the vector search be executed in a relatively wide area of the reference picture. Especially in the B-picture motion vector search, the forward and backward reference pictures are needed, and therefore the reference picture data the quantity of which is twice that of the picture with only the forward prediction effected, are required of the processor for obtaining the degree of correlation between the pictures. A large amount of accesses to the frame memories stored with the reference picture data are necessary for reading the above data.

As obvious from FIG. 3, according to the prior art, it is required that both of the motion vector search and the coding process be executed within a fixed time to perform the motion vector search just before coding. In this case, as a time spent for the motion vector search is limited, if a vector search range is taken large on the reference picture, it is impossible to effect the accesses to the frame memories enough to transfer the necessary data. This results in a difficulty to secure the sufficient motion vector search range.

Further, if the B-picture is frequently used, there must be inevitably a longer distance between the P-picture and the refernce frame which the P-picture references. Accordingly, there arises a necessity for taking a broader motion vector search range. In this case also, however, the accessing to the frame memories similarly increases in quantity, and this conduces to a problem of being incapable of securing the sufficient motion vector search range.

SUMMARY OF THE INVENTION

An apparatus for solving the above problems according to the present invention, comprises a frame memory, composed of at least a plurality of areas, for storing picture data about an original picture and a reference picture, a controller for controlling the frame memory on the basis of predictive system data given from outside and determining a motion vector between the pictures by obtaining a degree of correlation between the original picture and the reference picture, and a motion vector data storage device for storing motion vector data.

The controller according to the present invention is constructed of a frame memory control unit to which predictive system data is inputted from outside, and a degree-of-correlation calculating unit.

Herein, the frame memory is sectioned into an area used for inputting pictures, an area stored with a motion vector searching target picture, an area stored with a prospective motion vector searching target picture, and an area stored with a picture referred to in common, and the frame memory control unit designates a bank (an address), thereby reading the data therefrom.

The degree-of-correlation calculating unit calculates a degree of correlation with respect to a reference picture block upon inputting picture block data of a searching target area from each of the areas of the frame memory, and thereby calculates a motion vector. A memory for storing the motion vector data, is temporarily stored with the motion vector calculated by the degree-of-correlation calculating unit.

The frame memory control unit and the degree-of-correlation calculating unit, when searching a motion vector in an arbitrary area of a designated picture, and if the frame memory contains the area within an unprocessed picture with the same area being referred to as the area within a reference picture to which the designated picture refers, simultaneously perform the motion vector search with respect to this area. Then, the frame memory control unit and the degree-of-correlation calculating unit store the vector data storage device (a motion vector data storage memory) with a piece of vector data of the above area with respect to the prospective picture among pieces of above-obtained motion vector data, and, if the vector data obtained in the past about the above area of the present picture exists in the vector data storage device (the motion vector data storage memory), output the motion vector of the designated area in addition to the above-obtained motion vector data.

According to the present invention, when searching the motion vector, the quantity of reference picture data to be read from the frame memory can be reduced. Instead, although there must be increased a read quantity of the original picture data from the frame memory and a write accessing quantity to the memory to store a result of searching the motion vector, the I/O data quantity with respect to the memory can be reduced on the whole. It is therefore feasible to execute the motion vector search while securing the same search range as that in the prior art by use of a more inexpensive memory that is slow of inputting and outputting the data. Alteratively, the motion vector can be searched in a much broader range by use of the memory having the same I/O speed as the prior art.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

A first apparatus for solving the above problems according to the present invention, is constructed of controller, prepared with a frame memory, composed of at least a plurality of areas, for storing picture data about an original picture and a reference picture, a controller for controlling the frame memory on the basis of predictive system data given from outside and determining an inter-picture motion vector by obtaining a degree of correlation between the original picture and the reference picture, and a motion vector data storage device for storing the motion vector data.

Figure 15:
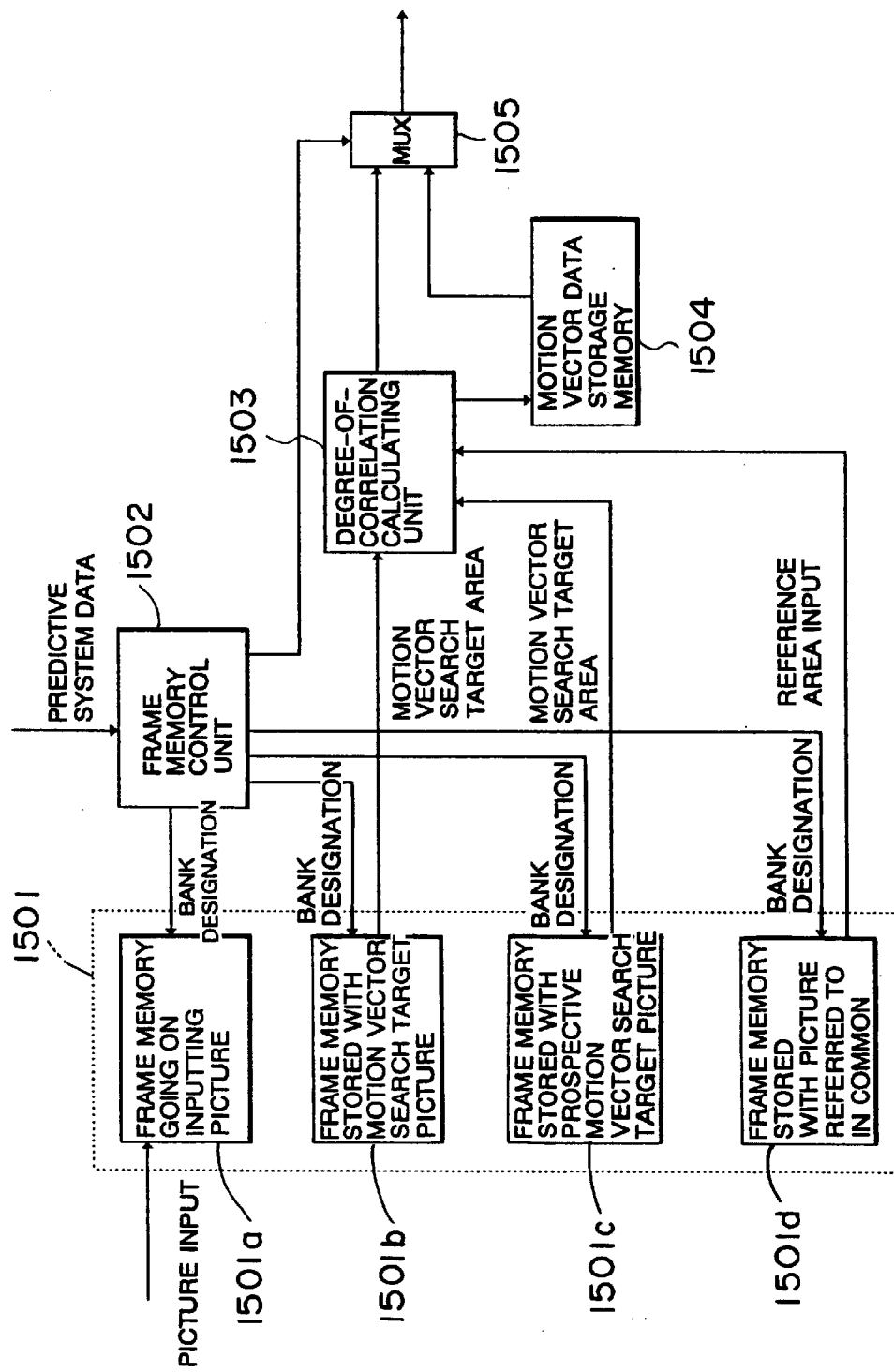
FIG. 15 is a functional block diagram of a motion searching apparatus corresponding to a first apparatus for solving the above problems according to the present invention.

FIG. 15 is a principle diagram showing the first apparatus.

The controller according to the present invention is constructed of a frame memory control unit 1502 to which predictive system data is inputted from outside, and a degree-of-correlation calculating unit 1503.

A frame memory 1501 is sectioned into an area 1501a used for inputting pictures, an area 1501b stored with a motion vector searching target picture, an area 1501c stored with a prospective motion vector searching target picture, and an area 1501d stored with a picture referred to in common. The frame memory control unit 1502 designates a bank (address), thereby reading the data therefrom.

The degree-of-correlation calculating unit 1503 calculates a degree of correlation with respect to a reference picture block upon inputting picture block data of a searching target area from each of the areas of the frame memory 1501, and thereby calculates a motion vector. A memory 1504 for storing motion vector data, is temporarily stored with the motion vector calculated by the degree-of-correlation calculating unit 1503. The numeral 1505 represents a multiplexing unit.

The above frame memory control unit 1502 and the degree-of-correlation calculating unit 1503, when searching a motion vector (1501b) in an arbitrary area of a designated picture, and if the frame memory contains the area 1501c within an unprocessed picture with the same area being referred to as the area 1501d within a reference picture to which the designated picture refers, simultaneously perform the motion vector search with respect to this area. Then, the frame memory control unit 1502 and the degree-of-correlation calculating unit 1503 store the vector data storage device (the motion vector data storage memory 1504) with a piece of vector data of the above area with respect to the prospective picture (1501c) among pieces of above-obtained motion vector data, and, if the vector data obtained in the past about the above area of the present picture exists in the vector data storage device (the motion vector data storage memory 1504), output the motion vector of the designated area in addition to the above-obtained motion vector data.

A second apparatus for solving the above problems according to the present invention, when obtaining a forward motion vector in an arbitrary area within a designated picture, and if there might be a picture with a prediction effected using the same reference picture in the past and the vector data storage device is stored with the forward motion vector, reads this forward motion vector therefrom and performs the forward motion vector search on the basis of coordinates indicated by that motion vector.

Figure 16:
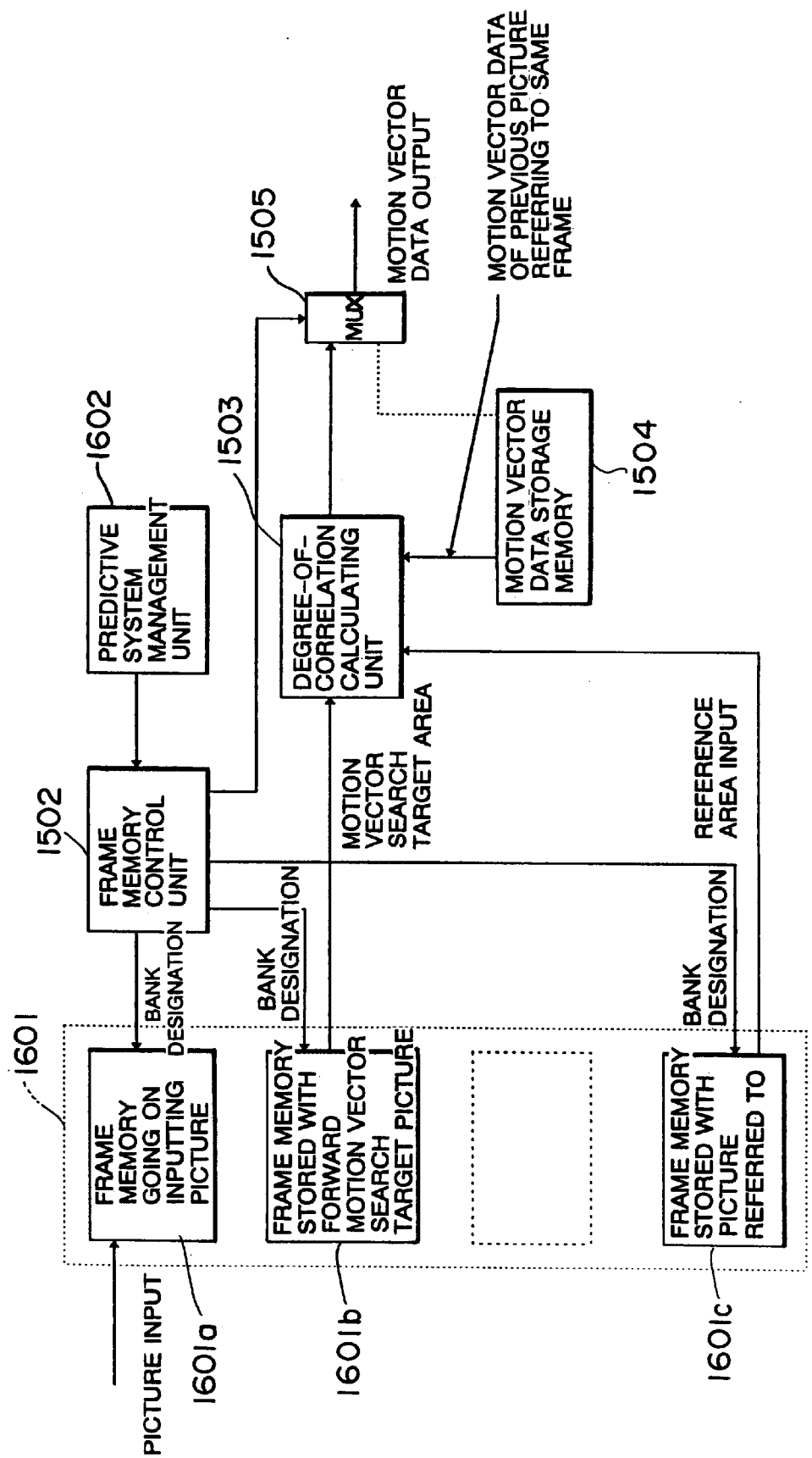
FIG. 16 is a functional block diagram of a motion searching apparatus corresponding to the second and fourth apparatus for obviating the above problems according to the present invention.

FIG. 16 is a principle diagram illustrating the second apparatus.

A controller in this second apparatus is also constructed of the frame memory control unit 1502 and the degree-of-correlation calculating unit 1503. The frame memory control unit 1502 is supplied with predictive system data from a predictive system management unit 1602.

A frame memory 1601 is sectioned into an area 1601a used for inputting pictures, an area 1601b stored with a forward motion vector searching target picture, and an area 1601c stored with a picture referred to. The frame memory control unit 1502 designates a bank (address), thereby reading the data therefrom.

The degree-of-correlation calculating unit 1503 calculates a degree of correlation with respect to a reference picture block upon inputting picture block data of a searching target area from each of the areas of the frame memory 1601, and thereby calculates a motion vector. The memory 1504 for storing the motion vector data, is temporarily stored with the motion vector calculated by the degree-of-correlation calculating unit 1503. The numeral 1505 denotes the multiplexing unit.

Referring to FIG. 16, when obtaining a forward motion vector in an arbitrary area 1601b within the designated picture, the frame memory control unit 1502 detects that there exists a picture with the prediction effected using the same reference picture in the past, and, if the motion vector data storage memory 1504 is stored with the forward motion vector, reads this forward motion vector. Then, the frame memory control unit 1502 performs the forward motion vector search on the basis of coordinates indicated by that motion vector.

A third apparatus for obviating the above problems according to the present invention is constructed of a frame memory, composed of at least a plurality of areas, for storing picture data about an original picture and a reference picture, a controller for controlling the frame memory based on the predictive system data given from outside and determining an inter-picture motion vector by obtaining a degree of correlation between the original picture and the reference picture, and a motion vector data storage device for storing the motion vector data.

Figure 17:
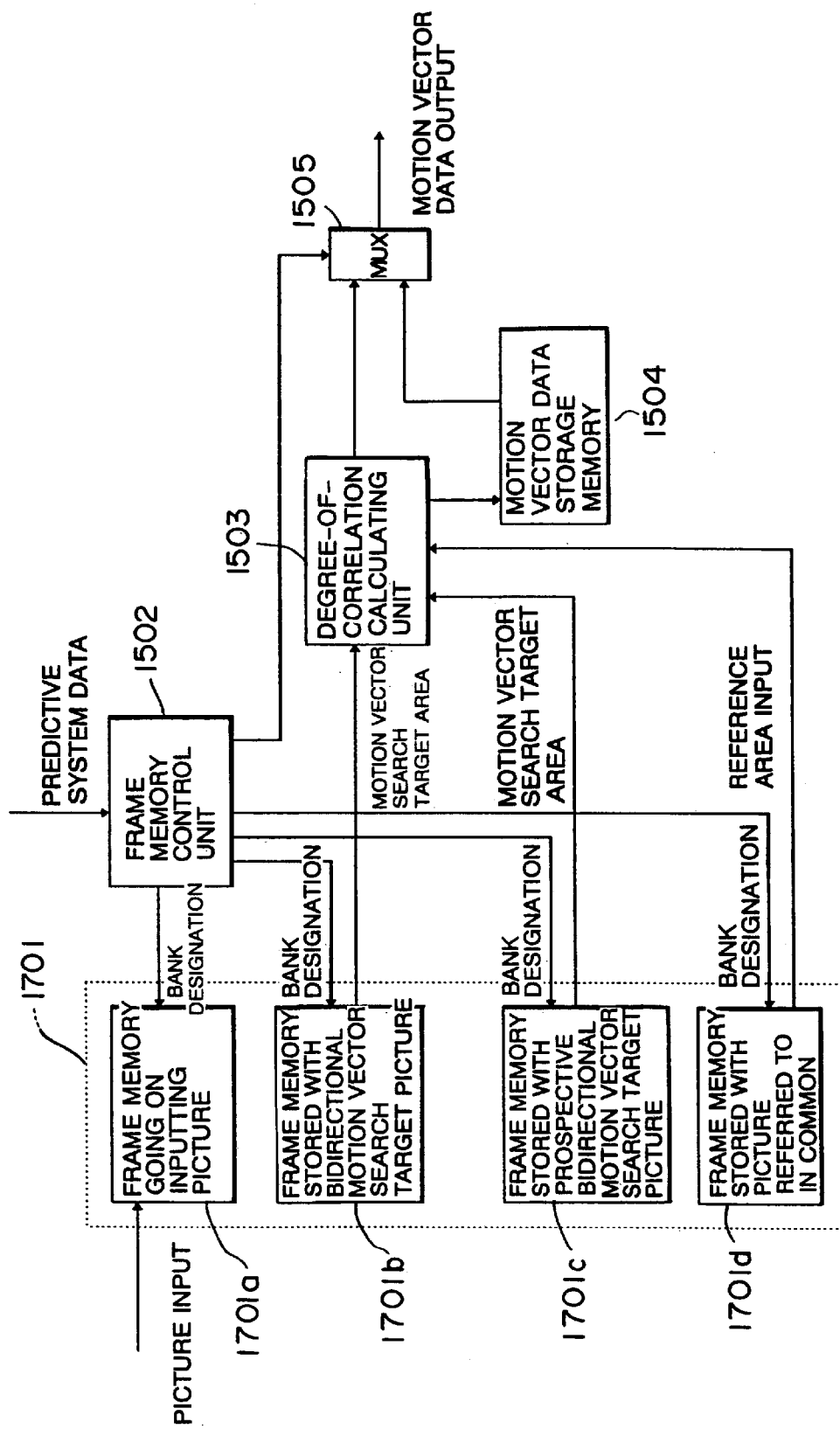
FIG. 17 is a functional block diagram of a motion searching apparatus corresponding to the third apparatus for obviating the above problems according to the present invention.

FIG. 17 is a principle diagram showing the third apparatus.

The controller in this third apparatus comprises the frame memory control unit 1502 to which the predictive system data is inputted from outside, and the degree-of-correlation calculating unit 1503.

The frame memory 1701 is sectioned into an area 1701a used for inputting pictures, an area 1701b stored with a bidirectional motion vector searching target picture, an area 1701c stored with a prospective motion vector searching target picture, and an area 1701d stored with a picture referred to in common. The frame memory control unit 1502 designates a bank (address), thereby reading the data therefrom.

The degree-of-correlation calculating unit 1503 calculates a degree of correlation with respect to a reference picture block upon inputting picture block data of a searching target area from each of the areas of the frame memory 1701, and thereby calculates a motion vector. The memory 1504 for storing motion vector data, is temporarily stored with the motion vector calculated by the degree-of-correlation calculating unit 1503. The numeral 1505 represents the multiplexing unit.

Referring to FIG. 17, the frame memory control unit 1502 and the degree-of-correlation calculating unit 1503, when searching a backward motion vector in an arbitrary area (1701b) of a designated bidirectional predictive picture, and if the frame memory contains the area 1701c within an unprocessed bidirectional predictive picture that is to refer forward to the same area as the intra reference picture area to which the intra bidirectional predictive picture area refers backward, simultaneously perform the forward motion vector search with respect to this area. Then, the frame memory control unit 1502 and the degree-of-correlation calculating unit 1503 store the motion vector data storage memory 1504 with the above-obtained prospective area forward motion vector data, and output, as designated area motion vector data, the above-obtained backward motion vector data and the forward motion vector data already obtained in the past by the same method as the above-mentioned and stored in the motion vector data storage memory 1504 via the multiplexing unit 1505.

A fourth apparatus for obviating the above problems according to the present invention, when there is a picture with the prediction effected using the same reference picture sometime back, and if the motion vector data storage device is stored with the forward motion vector thereof, reads this forward motion vector therefrom and performs the forward motion vector search of a forward predictive picture on the basis of the coordinates indicated by the motion vector.

A principle diagram thereof is the same as FIG. 16 showing the second apparatus explained along therewith.

Referring to FIG. 16, the frame memory control unit 1502 and the degree-of-correlation calculating unit 1503, when searching a forward motion vector on the basis of a forward motion vector searching target picture (1601b), and if there might be a picture with the prediction effected using the same reference picture in the past and the motion vector data storage memory 1504 is stored with the forward motion vector thereof, reads this forward motion vector therefrom and performs a forward motion vector search of a forward predictive picture on the basis of coordinates indicated by the motion vector.

A fifth apparatus for solving the above problems according to the present invention is concerned with a motion picture coding apparatus. The motion picture coding apparatus is constructed of devices for inputting a forward motion vector and a backward motion vector that are outputted from the above third apparatus, and forming a forward reference picture and a backward reference picture from local decode pictures by use of the above forward and backward motion vectors, a device for selecting a reference picture from those respective reference as a predictive picture most approximate to the original picture, devices for quantizing and reversely quantizing difference data between the predictive picture and the original picture, and a device for storing the reversely-quantized data as local decode picture data.

Figure 18:
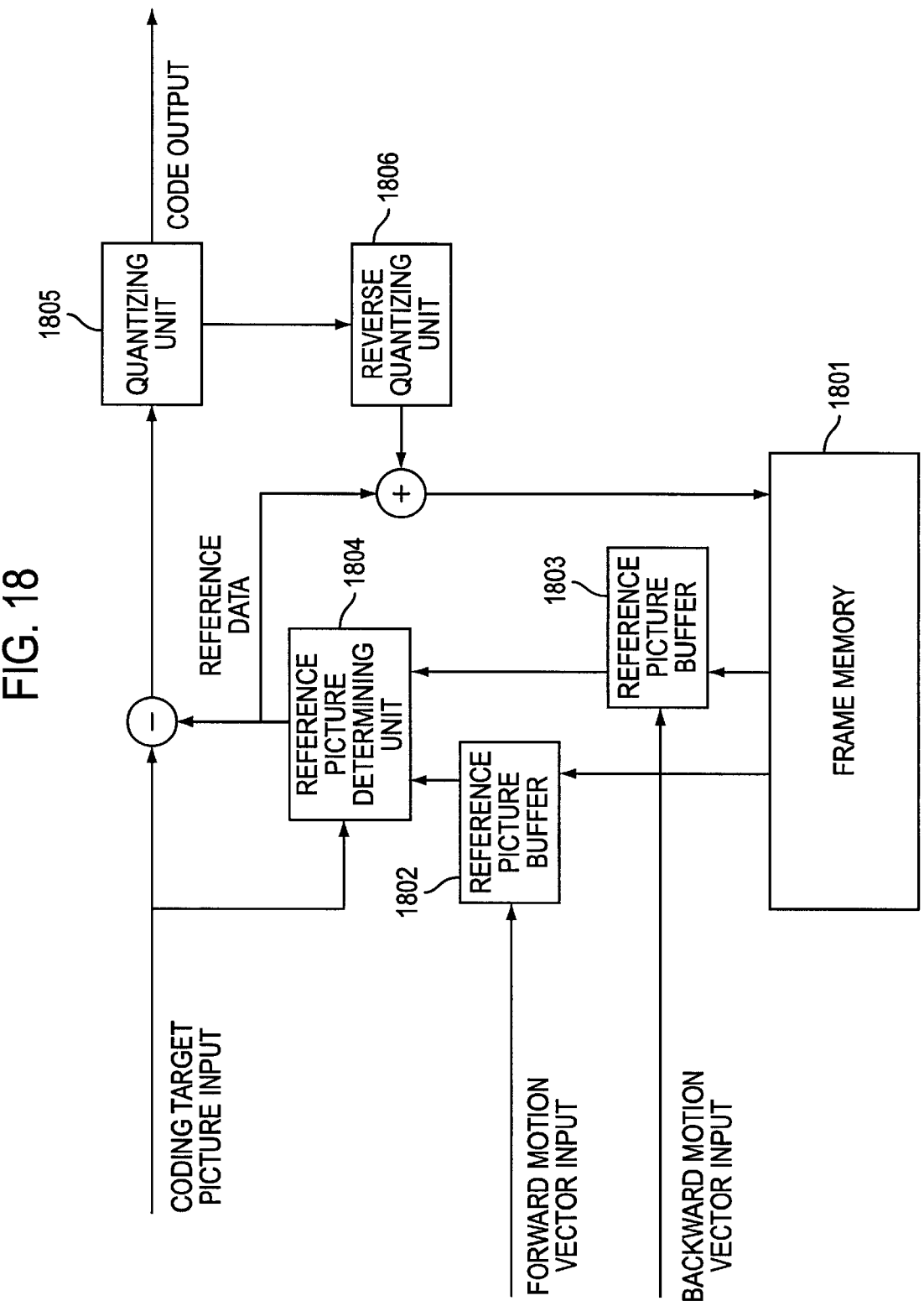
FIG. 18 is a functional block diagram of a coding apparatus corresponding to fifth and sixth apparatuses for obviating the above problems according to the present invention.

FIG. 18 is a principle diagram illustrating the fifth apparatus.

The forward motion vector and the backward motion vector that are given from the motion vector searching apparatus shown by way of the first through fourth apparatuses, are inputted to respective reference picture buffers 1802, 1803. Then, the reference picture buffers 1802, 1803 read reference pictures from a frame memory 1801. Reference picture data read from these reference picture buffers 1802, 1803 to a reference picture determining unit, are selectively subtraction-processed with respect to coding target picture data, and a difference therebetween is quantized by a quantizing unit 1805. The thus quantized data is reversely quantized by a reverse quantizing unit 1806. The reversely quantized data is thereafter added to the above reference picture data and stored as restored picture data in the frame memory.

A sixth apparatus for obviating the above problems according to the present invention is constructed to pick up a picture, as a predictive picture, having a smaller pixel difference absolute value sum in pixels between the reference pictures and the original picture.

To explain the sixth apparatus similarly referring to a principle diagram of FIG. 18, an accumulated value of differences between the reference picture data and the coding target picture (original picture), is calculated, and only the picture having the smaller pixel difference absolute value sum in pixels between the reference pictures and the original picture may be outputted to the quantizing unit 1805. In this case, for example, a plurality of difference accumulated value calculating devices and a comparing device for making comparisons therebetween may be provided between the quantizing unit 1805 and a difference arithmetic unit.

According to the present invention, a motion vector data storage device (e.g., a memory) for storing the motion vector is newly provided, whereby the forward motion vector search effected for the forward prediction in the vector searching process for coding a B-picture is executed asynchronously with the coding process to disperse frame memory accessing. Further, at the same time, it is feasible to obtain data for narrowing down a motion vector search range in a P-picture.

Figure 4:
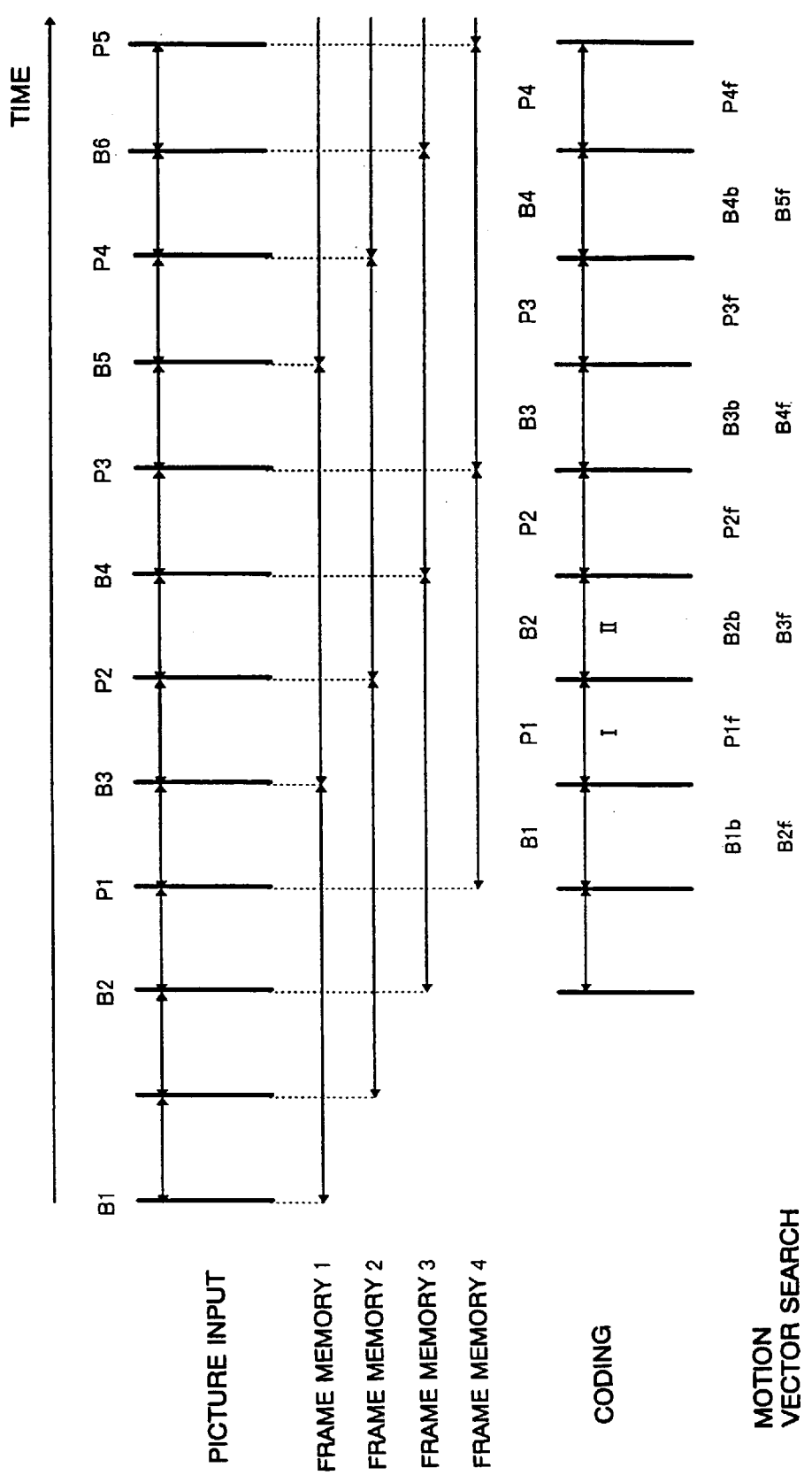
FIG. 4 is a chart diagram showing a time relationship between a picture input and a motion vector search according to the present invention.
Figure 8:
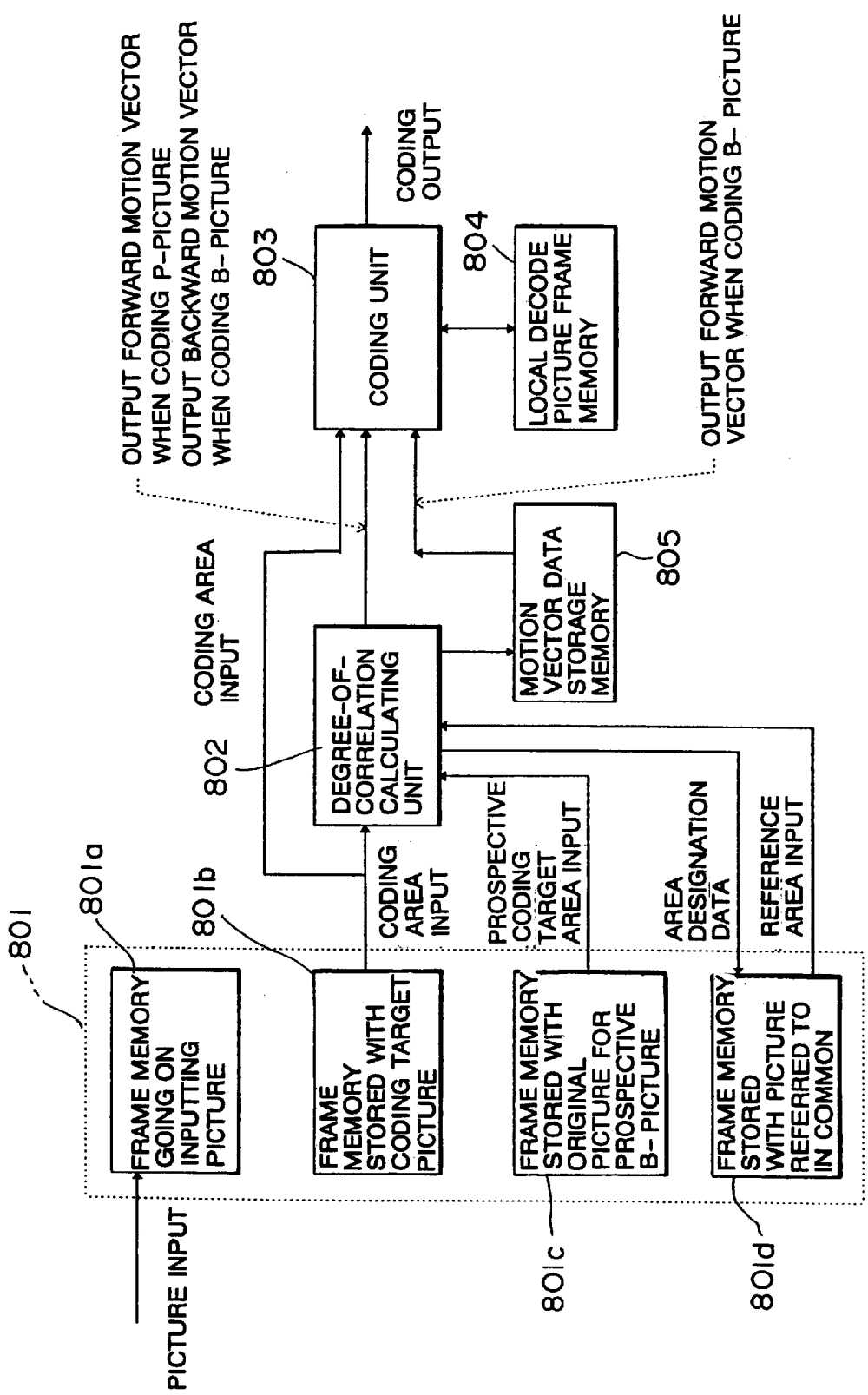
FIG. 8 is a block diagram of a coding apparatus using a motion vector searching method according to the present invention.
Figure 9:
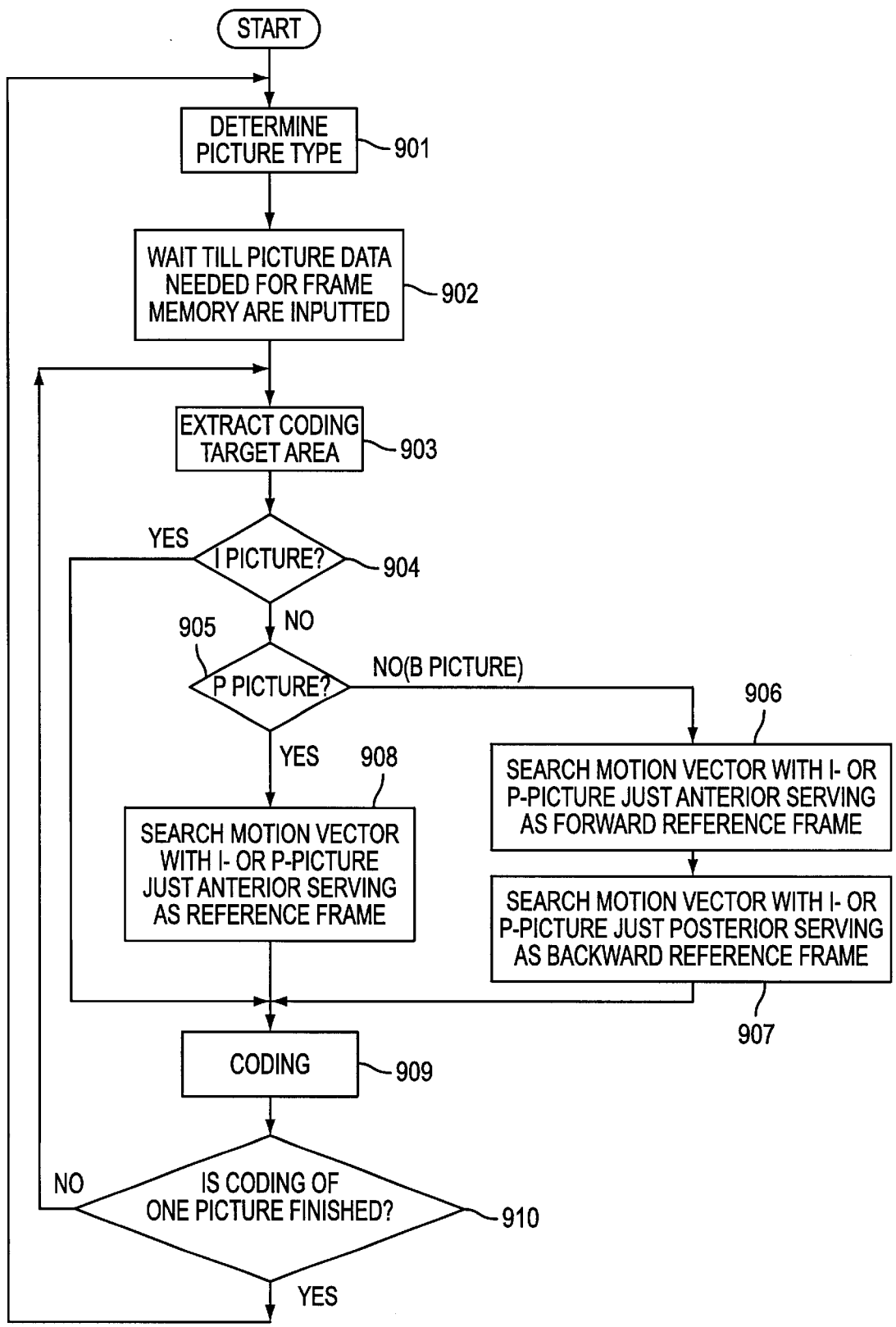
FIG. 9 is a flowchart showing a coding process using the conventional motion vector searching method.
Figure 10:
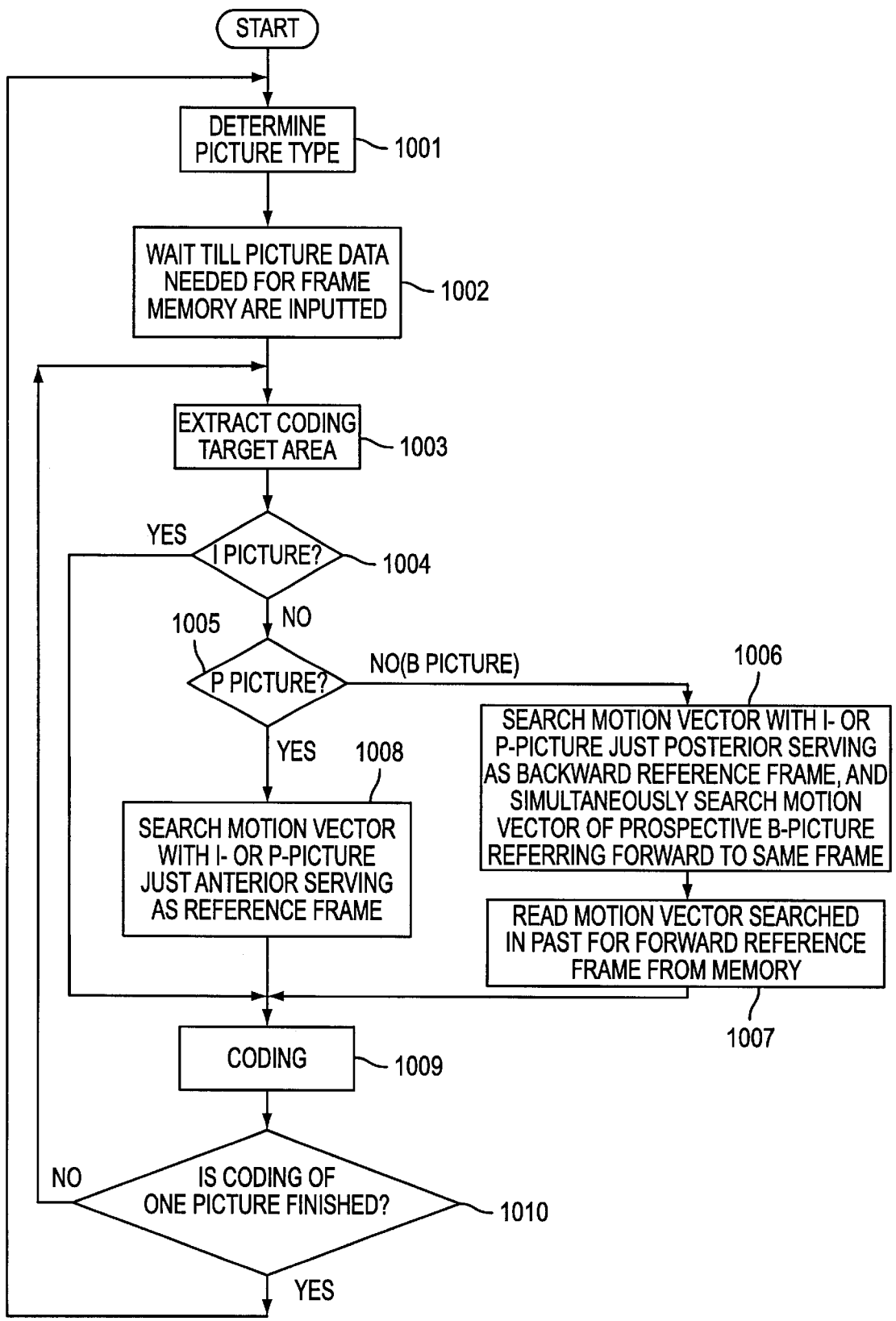
FIG. 10 is a flowchart showing a coding process using the motion vector searching method according to the present invention.

FIG. 8 is a diagram illustrating a construction of a coding apparatus using the motion vector searching method according to the present invention, and FIG. 10 is a flowchart thereof. Further, FIG. 4 shows an example of sequence of the coding processes and the motion vector search as well.

Referring to FIG. 8, a frame memory 801 is so used as to be sectioned into an area 801a used for inputting pictures, an area 801b for storing a coding target picture, an area 801c for storing an original picture for a prospective B-picture, and an area 801d stored with a picture referred to in common. A degree-of-correlation calculating unit 802 carries out a motion vector search. This degree-of-correlation calculating unit 802, upon inputting coding area data (801b) of the coding target picture, designates the area (801d) for a forward reference picture and a backward reference picture, and picture data of a reference area is inputted based on these reference pictures.

Inputted, herein, to the degree-of-correlation calculating unit 802 for performing the motion vector search are only pixel data (801b) of the area that serves as a coding target of the original picture and pixel data (801d) of a reference range of the forward reference picture as in the same way with the prior art method when coding the P-picture.

Figure 5:
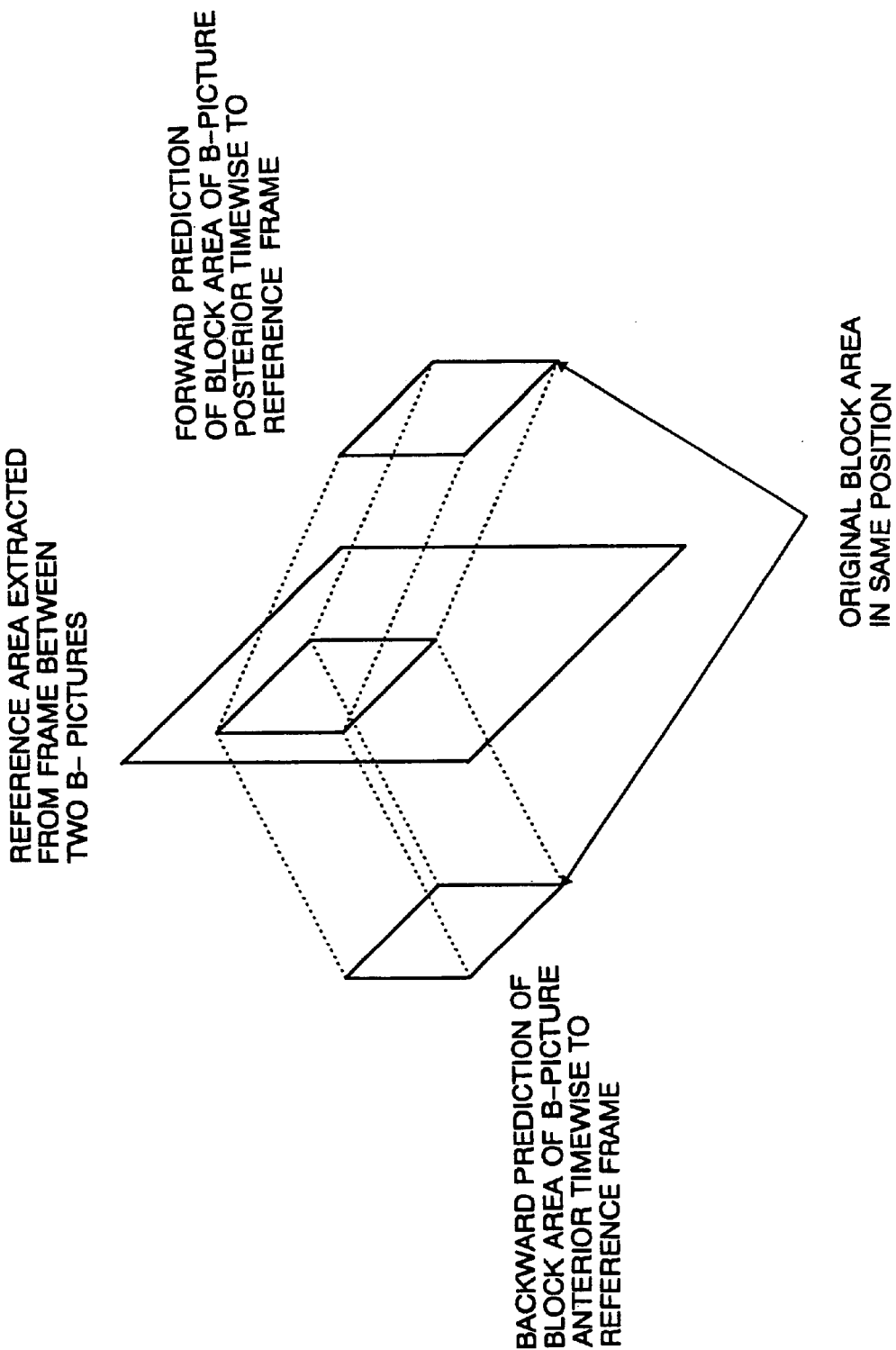
FIG. 5 is an explanatory conceptual diagram showing a batch process of forward and backward motion vector searches of two B-pictures on the basis of the same reference picture data.
Figure 6:
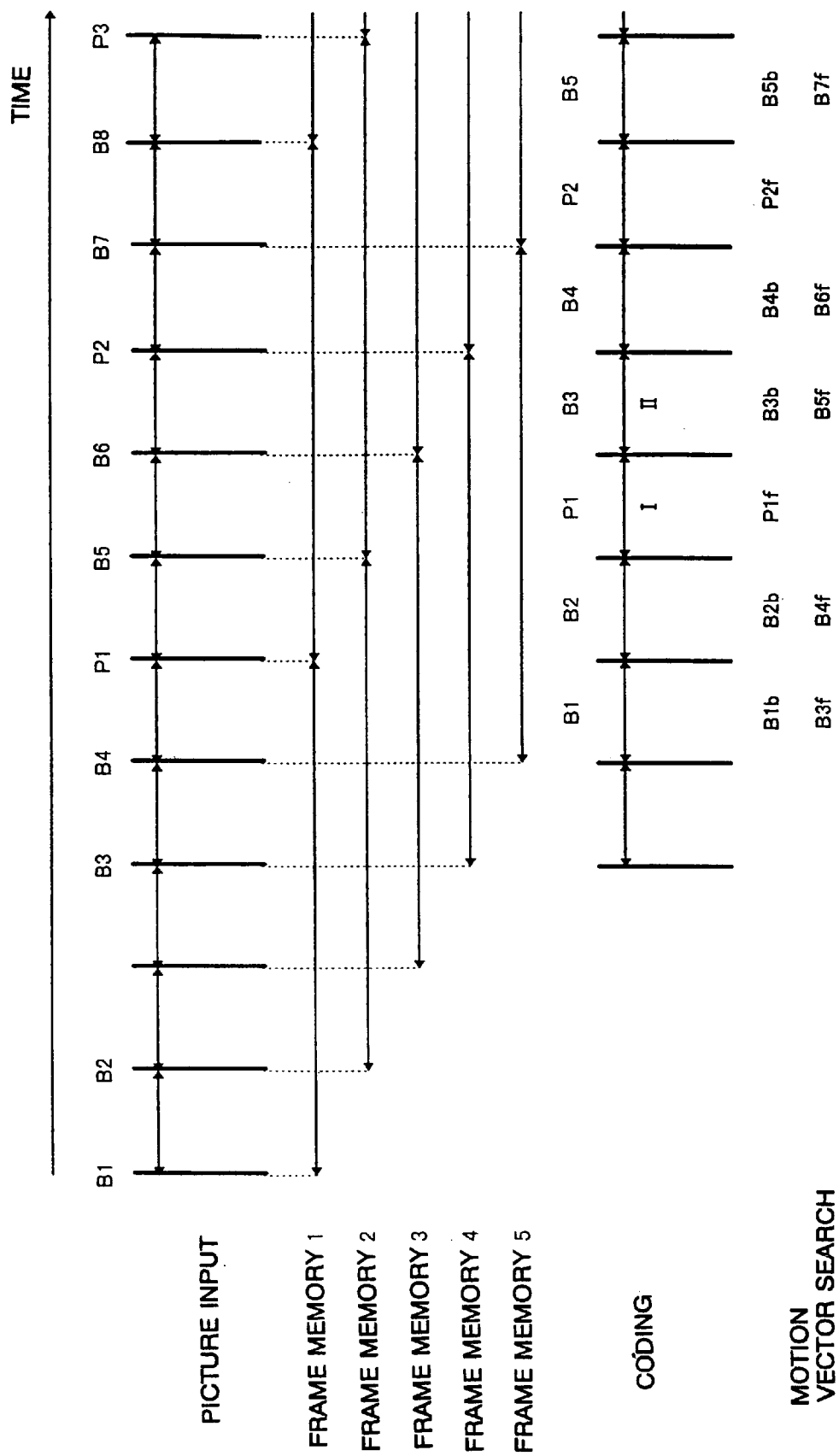
FIG. 6 is a chart diagram showing a time relationship between the picture input and the motion vector search according to the present invention.
Figure 7:
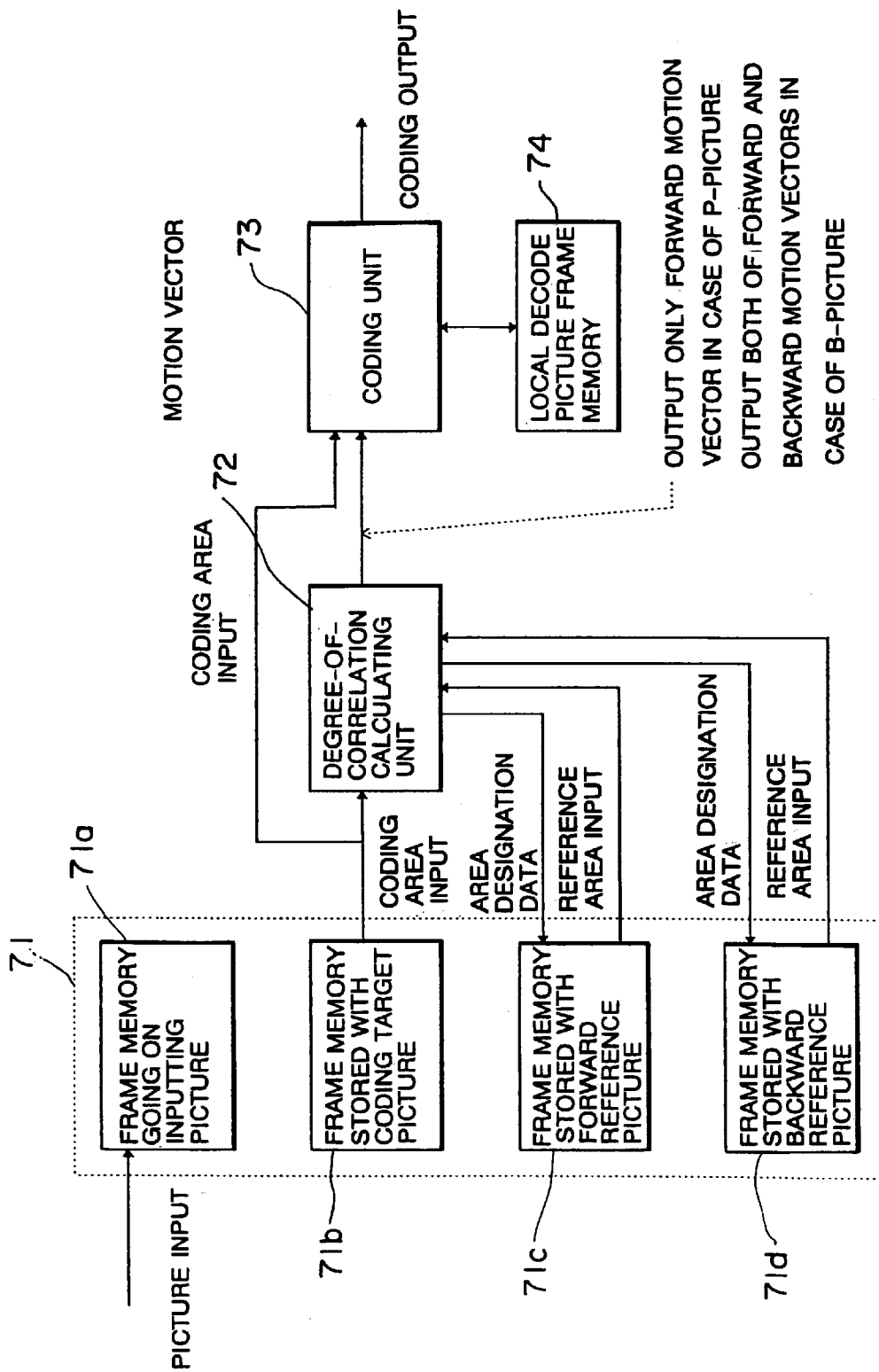
FIG. 7 is a functional block diagram of a coding apparatus using a conventional motion vector searching method.

When coding the B-picture, there must be three kinds of inputs such as the pixel data (801b) of an area within the picture to be coded, the pixel data (801c) of an area with the same picture referred forward to as the present coding target picture as well as being the prospective B-picture, and the pixel data (801d) within a reference range of a frame to be referred respectively forward backward to in common as well as becoming an area for those two coding targets. In this case, the degree-of-correlation calculating unit 802, as illustrated in FIG. 5, is capable of calculating a degree of correlation between the two pictures at one time by simultaneously moving two original pictures in parallel with respect to one reference picture.

FIG. 10 is a flowchart for explaining in greater detail the coding process shown in FIG. 8.

To start with, when determining a picture type, e.g., P-picture coding or B-picture coding (1001), there must be a standby status till the required picture data are inputted to the frame memory 71 (1002). Upon inputting the picture data, the picture data of the coding target area is extracted out (1003), and the processing is diverged depending on the kinds (the I-picture, or the P-picture, or the B-picture) of the relevant picture data (1004, 1005). More specifically, in the case of the I-picture, the processing moves directly to a coding step (1009). In the case of the P-picture, the motion vector search is executed with the I- or P-picture just anterior serving as a reference frame (1008), and thereafter the coding step is implemented (1009).

Furthermore, in the case of the B-picture, the motion vector search is effected with the I- or P-picture just posterior serving as a backward reference frame, and simultaneously there is performed the motion vector search of the prospective B-picture referred forward to with respect to the same frame (1006).

Then, the motion vector with respect to the forward reference frame, which vector has come to a completion of its being searched, is read from a motion vector storage unit 805 (1007).

Figure 11:
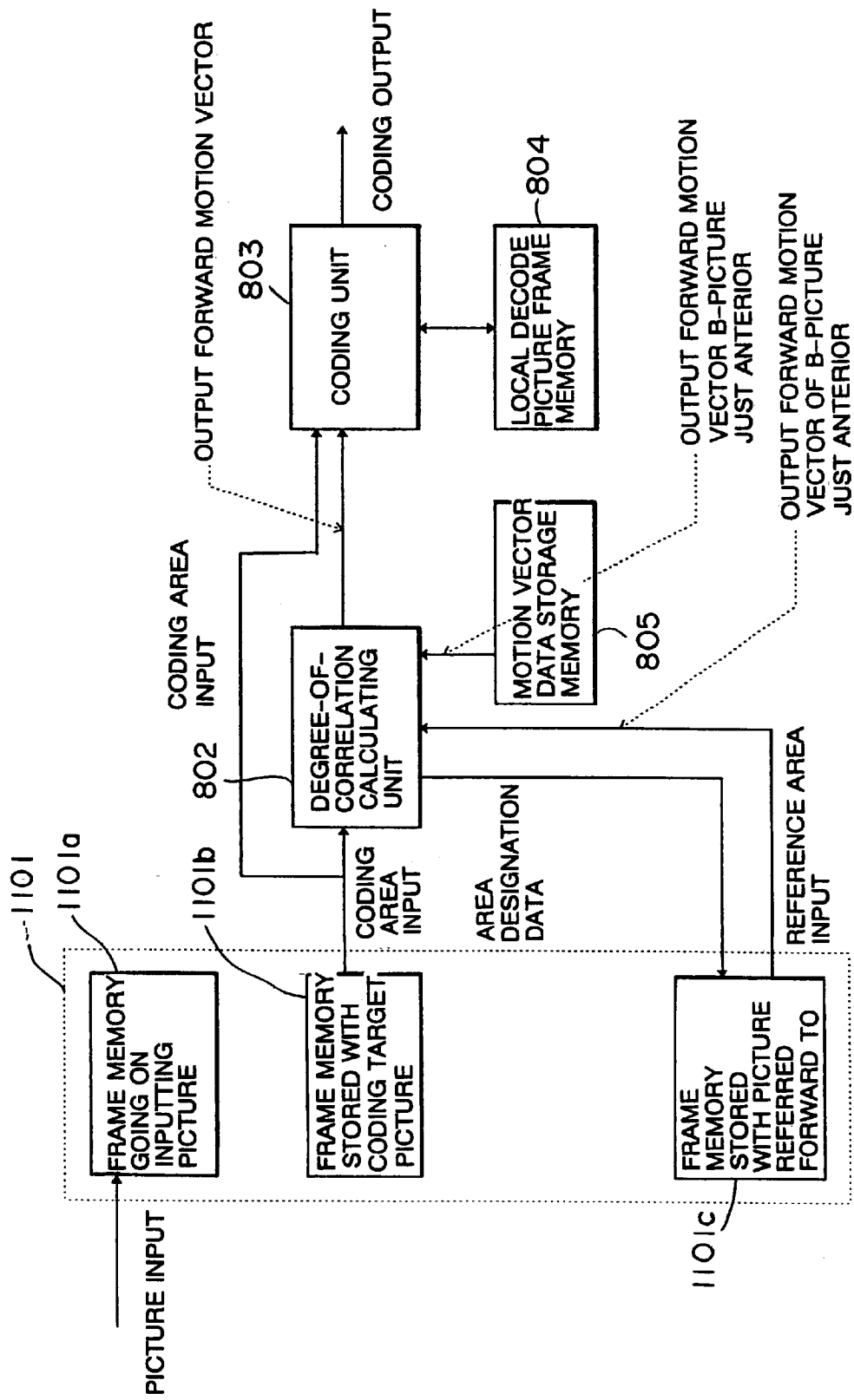
FIG. 11 is a functional block diagram of the coding apparatus when searching the vector in the case of a P-picture by making use of a forward vector of a B-picture just anterior.

FIG. 11 is a block diagram showing a construction of the coding apparatus in terms of functions in steps 1006 and 1007. When coding the P-picture, there must be two kinds of inputs such as the pixel data (1101b) of an area within the picture to be coded, the pixel data (1101c) within a reference range of the I- or P-picture just anterior. And if there was the picture with the prediction effected using the same I- or P-picture as the reference picture in the past, and if the motion vector data storage device (805) is stored with the forward motion vector thereof, reads this forward motion vector therefrom and performs the forward motion vector search of the P-picture on the basis of the coordinates indicated by the motion vector.

Then, a series of processes discussed so far are repeated per picture (910).

According to the system proposed in the present invention, the forward motion vector search of the B-picture starts, as shown in FIG. 4, immediately after inputting the original picture. For instance, a forward motion vector search (expressed by B3f in FIG. 4) of B3 starts immediately after an end of inputting B3. Herein, the same reference picture P1 is used both for a B3 forward prediction and for a B2 backward prediction (expressed by B2b in FIG. 4), and hence a read access to the frame memory to transfer the reference picture can be done at one time by processing the motion vector searches of these two frames at one time.

Figure 1:
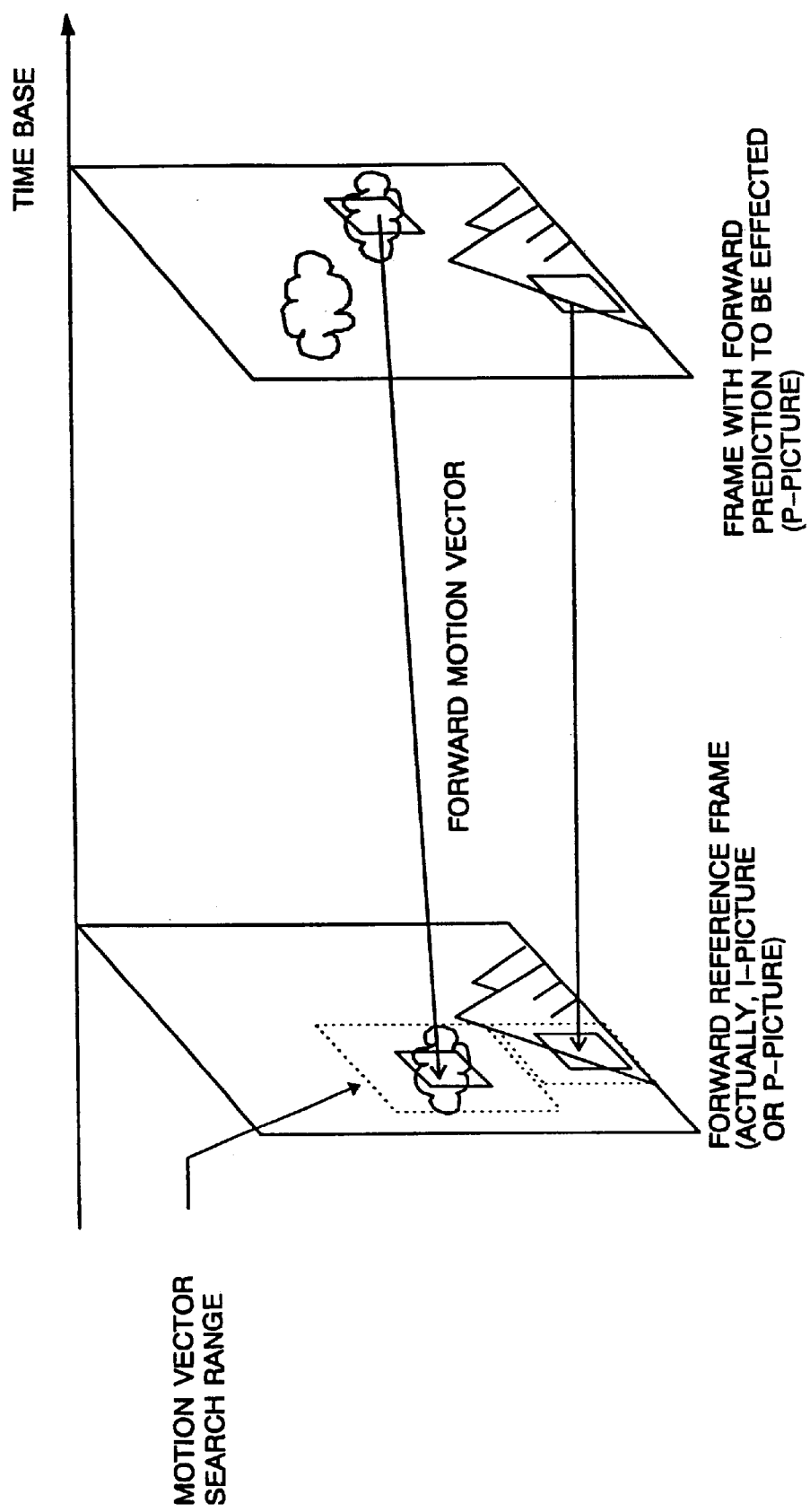
FIG. 1 is an explanatory conceptual diagram showing a forward prediction in MPEG.
Figure 2:
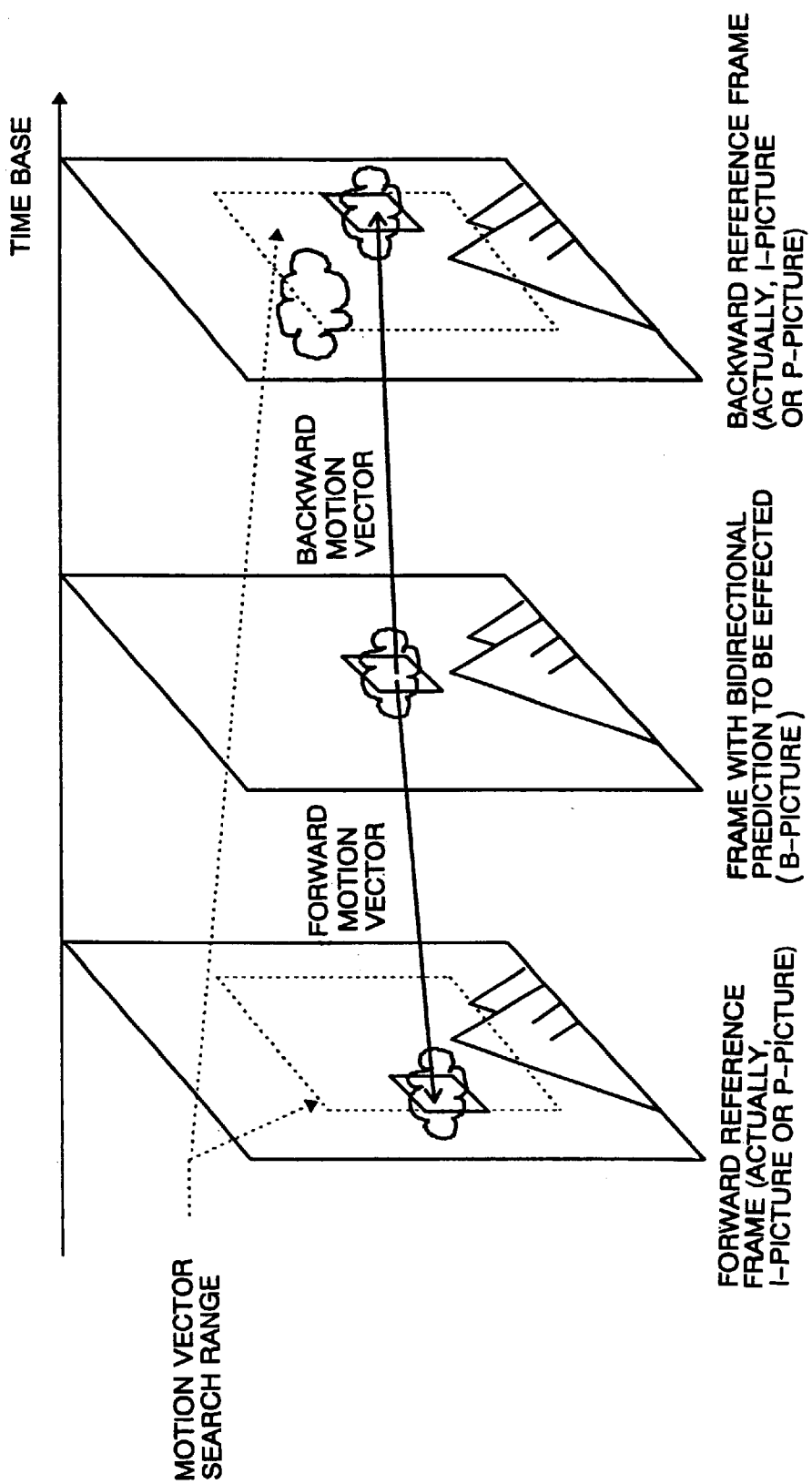
FIG. 2 is an explanatory conceptual diagram showing a bidirectional predictions in MPEG.
Figure 3:
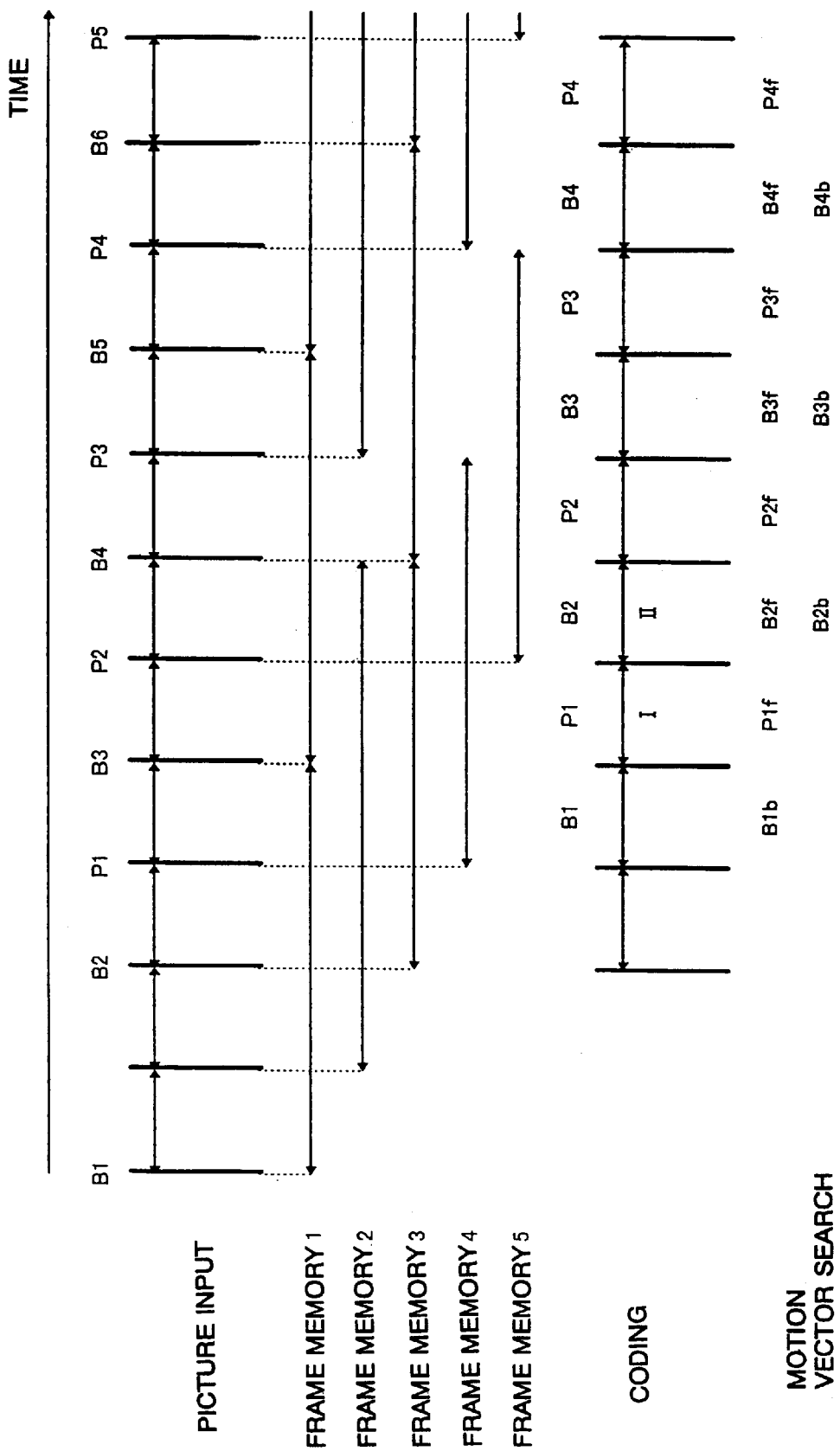
FIG. 3 is a chart diagram showing a time relationship between a picture input and a motion vector search in a prior art coding apparatus.

As a result, the accessing to the frame memory can be reduced down to half as compared with the prior art system wherein pieces of reference picture data are individually transferred. Further, as compared with the prior art shown in FIG. 3, a period for which to store the reference frame can be shortened, and therefore the frame memory for one area becomes unnecessary.

Moreover, according to the prior art method, there is not alternative but to make a direct comparison with the pixels of P1 to perform the forward motion vector search of P2. In the case of frequently using the B-frame, the alternative method is to widen the motion vector search range of the P-frame in order to secure a searching precision.

According to the present invention, however, the forward motion vector search B3f has already been finished just when starting the P2 motion vector search, and, with reference to this result, the motion vector search range can be narrowed down.

Further, there is a waiting time till the coding process is actually done since the forward motion vector search has been executed, and hence a memory for storing the motion vector is newly required. This capacity may be, however, by far less than that of the one-area frame memory that has become unnecessary. In the case of, e.g., MPEG-1, one quantity of vector is needed per block area of 8 bits and 16×16 (256) pixels. Supposing that the motion vector range is within ±128 pixels in terms of both horizontal component and vertical component, a quantity of reference pixel data that can be reduced is 256 bytes per block, and contrastingly a quantity-of vector data to be newly stored is merely 2 bytes.

The present invention will hereinafter be described in greater detail by way of embodiments.

Embodiment 1

Figure 12:
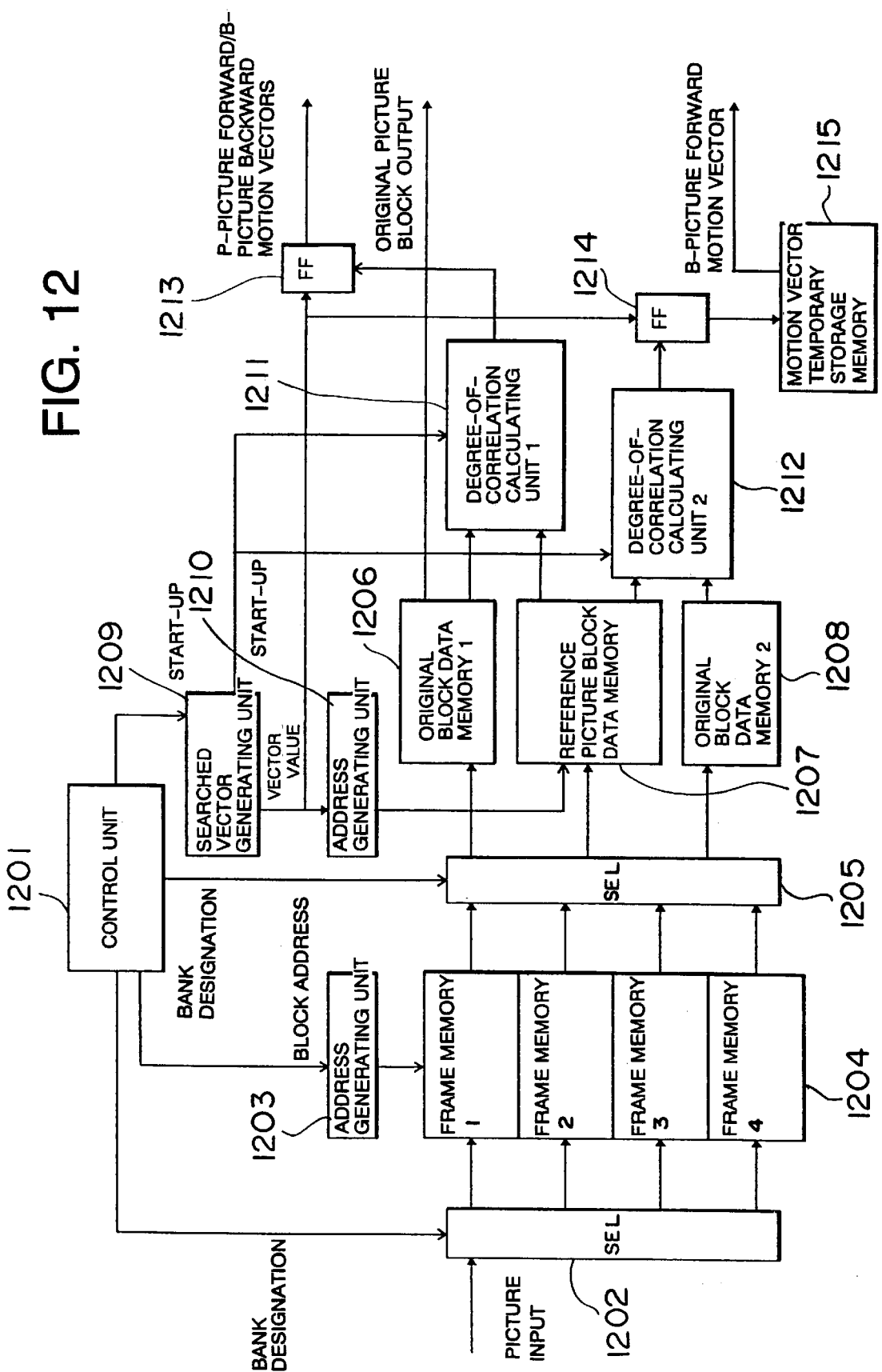
FIG. 12 is a functional block diagram of a motion searching unit in an embodiment 1 of the present invention.
Figure 13:
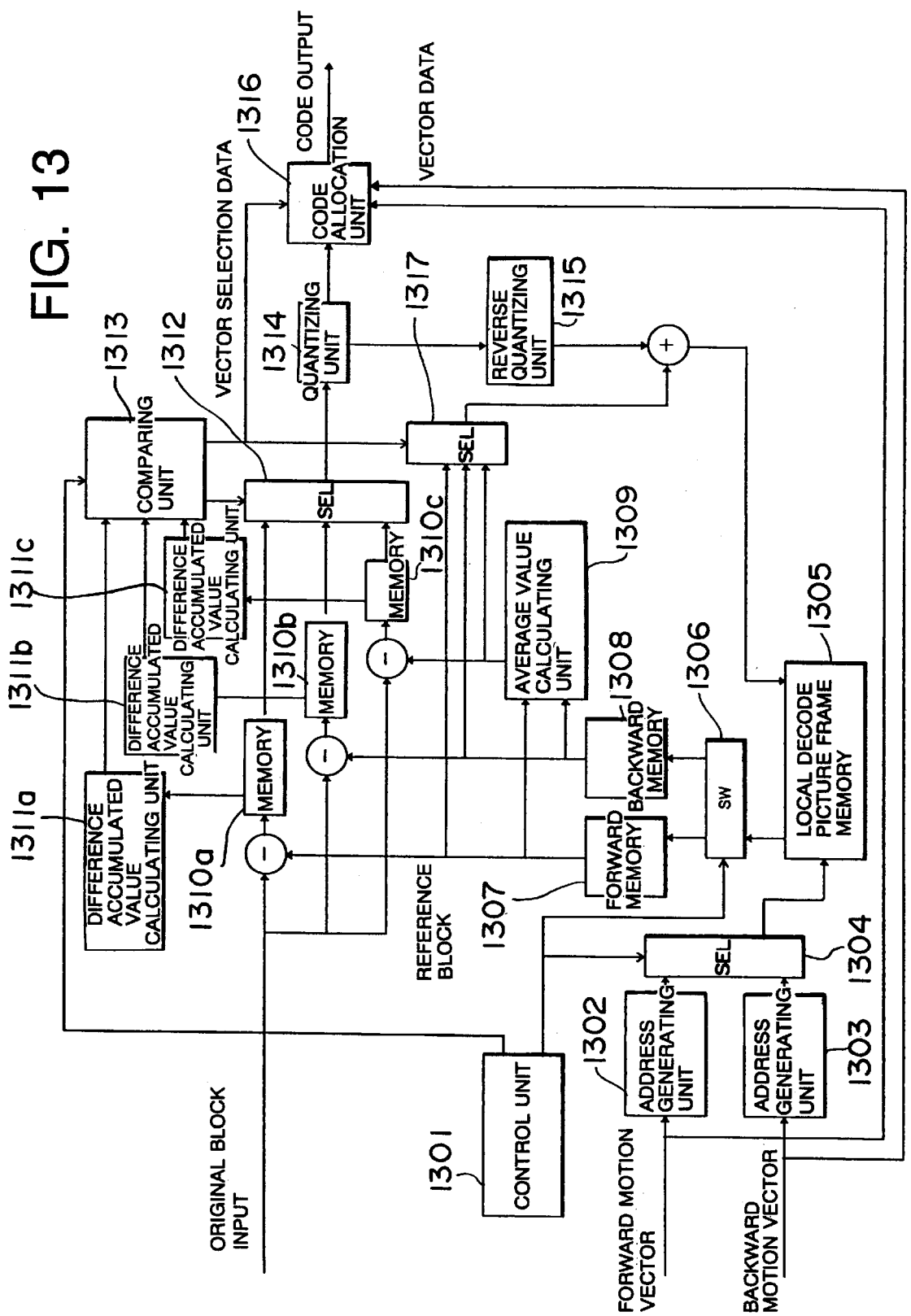
FIG. 13 is a functional block diagram of a coding unit in the embodiment 1 of the present invention.

FIG. 12 shows an example of a vector searching apparatus to which the present invention is applied. Further, FIG. 13 illustrates an example of an apparatus for coding the picture by use of the motion vector data outputted by the motion vector searching apparatus to which the present invention is applied.

Referring first to FIG. 12, control unit 1201 controls mainly the motion vector search. A selector 1202 incorporates a function to switch the picture data to be inputted trough a bank designation given from the control unit 1201. A frame memory 1204 is accessed from the control unit 1201 via an address generating unit 1203, thereby executing write and read processes. A read selector 1205 incorporates a function to selectively output the picture data read from the frame memory 1204 to an original picture block data memory 1206, a reference picture block data memory 1207, and an original block data memory 1208.

A vector generating unit 1209 for generating a vector for search is actuated by the control unit 1201. A value of the vector generated by the vector generating unit 1209 is transformed into memory address by an address generating unit 1210. And the pixel data of the reference block transfered from the reference picture block data memory 1207 to the both degree-of-correlation calculating unit 1211, 1212.

Degree-of-correlation calculating units 1211, 1212 each calculate a motion vector from each piece of picture data and output it to a coding unit via flip-flops FF (1213, 1214).

Further, a motion vector temporary storage memory 1215 temporarily stores a B-picture forward motion vector.

Picture processing will be explained with reference to a diagram showing the construction thereof.

At first, the processing in the case of the P-picture will be touched upon, however, it is assumed that the same search as the prior art is conducted for the P-picture in this embodiment. To begin with, under the control of the control unit 1201, the pixel data of the area to be coded are transferred via the selector 1205 to the original block data memory 1206 from the frame memory 1204. Corresponding to this transfer, the pixel data of the frame to be referred forward to, are similarly transferred via the selector 1205 to the reference picture block data memory 1207 from the frame memory 1204. Herein, it is assumed that the reference picture block secures a wide area enough to cover a position in which a certain object exists within the original picture block.

Next, in response to a signal transmitted from the control unit 1201, the data of the area having the same size as the original picture block size is transmitted from the reference picture block data memory to the degree-of-correlation calculating unit 1211, wherein a degree of correlation is calculated.

After this calculation onward, the reference picture block data memory 1207 sequentially transmits the block pictures shifted pixelwise in parallel in the horizontal or vertical direction to the degree-of-correlation calculating unit 1211 in accordance with a designation of the address calculated from a virtual vector value outputted from the searched vector generating unit 1209. Hence, a degree of correlation is obtained each time. A deviation from a position exhibiting a highest correlation in the end with respect to all the reference picture blocks, is outputted as a motion vector to the coding unit.

Next, the processing in the case of the B-picture will be described. To begin with, the pixel data of the are to be coded are transferred to the original block data memory 1206 from the frame memory 1204. Corresponding to this transfer, the pixel data of the frame to be referred backward to, are transferred to the reference picture block data memory 1207 from the frame memory 1204. At this time, the picture to be processed as a B-picture in the future and referring forward to the same reference picture, is inputted to the frame memory 1204.

Herein, among the frames as prospective candidates for the B-picture, the same area as the area with the B-picture that is going to be coded at present is transferred to the original block data memory 1208. Next, in response to the signal from the control unit 1201, the reference picture block data memory 1207 transmits the data of the area having the same size as the original block size to the degree-of-correlation calculating units 1211, 1212.

Subsequently, the degree-of-correlation calculating units 1211, 1212 calculate degree of correlations between respective pieces of original picture data (outputted from the memories 1206, 1208) and a reference picture block (data outputted from the memory 1207).

After this calculation onward, the reference picture block data memory 1207 transmits the block pictures shifted pixelwise in parallel in the horizontal or vertical direction to the degree-of-correlation calculating units 1211, 1212 in accordance with address values calculated by the address generating unit 1210 on the basis of a virtual vector value outputted from the searched vector generating unit 1209. Thus, a degree of correlation is calculated each time. Then, a deviation from a position exhibiting a highest correlation in the end with respect to all the reference picture blocks, is outputted as a motion vector.

The backward motion vector among the motion vectors calculated above is outputted to the posterior coding unit to be used for subsequent coding. The forward motion vector is stored in the motion vector temporary storage memory 1215 until the time when the prospective B-picture is to be processed. The forward motion vector of the B-picture to be coded at present has been similarly already stored in the motion vector temporary storage memory 1215, therefore read therefrom and outputted to the coding unit.

Next, a construction of the coding unit shown in FIG. 13 will be explained.

A control unit 1301 controls mainly the coding process. Address generating units 1302, 1303 generate addresses for accessing to a local decode picture frame memory 1305 on the basis of inputs of the forward and backward motion vectors. A selector 1304 controls the addresses for accessing to the local decode picture frame memory 1305 under the control of the control unit 1301.

A switch 1306 has a function to allocate the reference picture block data read from the local decode picture frame memory so as to store a forward memory 1307 and a backward memory 1308 with these pieces of reference picture block data.

An average value calculating unit 1309 incorporates a function to calculate an average value of the forward reference picture block data stored in the forward memory 1307 and the backward reference picture block data stored in the backward memory 1308.

Memories 1310a–1310c are defined as buffers for temporary storing the difference between the forward reference picture block data, the backward reference block data, the average reference picture block data, and the original picture block data respectively.

Difference accumulated value calculating units 1311a–1311c respectively have functions to calculate difference accumulated values between the forward reference picture block data, the backward reference picture block data, the average reference picture block data, and original picture block data. A comparator 1313 compares these difference accumulated values and select data to be outputted to a quantizing unit 1314 by controlling the selector 1312. Further, the comparator 1313 also controls a selector 1317 for selecting the reference picture block data for generating a decode picture to be written to the local decode picture frame memory 1305.

A coding allocation unit 1316 encodes the quantized data outputted from the quantizing unit 1314 with the motion vector data selected by the comparing unit 1313, and outputs the encoded data.

Next, an operation of the coding unit shown in FIG. 13 will be explained.

The forward motion vector is inputted in the case of the P-picture, and the reference picture block corresponding to an address designated by the address generating unit 1302 is read from the local decode frame memory 1305 via the selector 1304 on the basis of the designated address. This reference picture block is stored in the forward memory 1307 through the switch 1306, and further a difference between the reference picture block and the original block is calculated and stored in the memory 1310a. Further, this difference is quantized by the quantizing unit 1314 through the selector 1312. Moreover, thus quantized data is reversely quantized and added to the above reference picture block, thereby reproducing a decode picture. This decode picture is stored in the local decode picture frame memory 1305.

Two quantities of forward and backward vectors are inputted in the case of the B-picture, and the local decode picture frame memory 1305 is accessed based on addresses designated respectively by the address generating units 1302, 1303. Then, the reference picture blocks corresponding to the respective motion vectors are stored respectively in the forward memory 1307 and the backward memory 1308 via the switch 1306.

Herein, according to the MPEG-½ specifications, an average value of two reference pictures can be set as a reference picture in addition to the above two reference pictures, and hence the average value calculating unit 1309 previously calculates the average value.

Then, the forward reference picture block, the backward reference picture block and the average value (an average reference block) thereof are subjected to a subtracting process with the original block, and a difference calculated with respect to the one selected reference picture is quantized by the quantizing unit 1314 through the respective memories 1310a, 1310b, 1310c and further reversely quantized by the reverse quantizing unit 1315. The thus reversely quantized result is added to the reference picture block, thereby reproducing a decode picture. This decode picture is stored in the local decode picture frame memory 1305.

Embodiment 2

Figure 14:
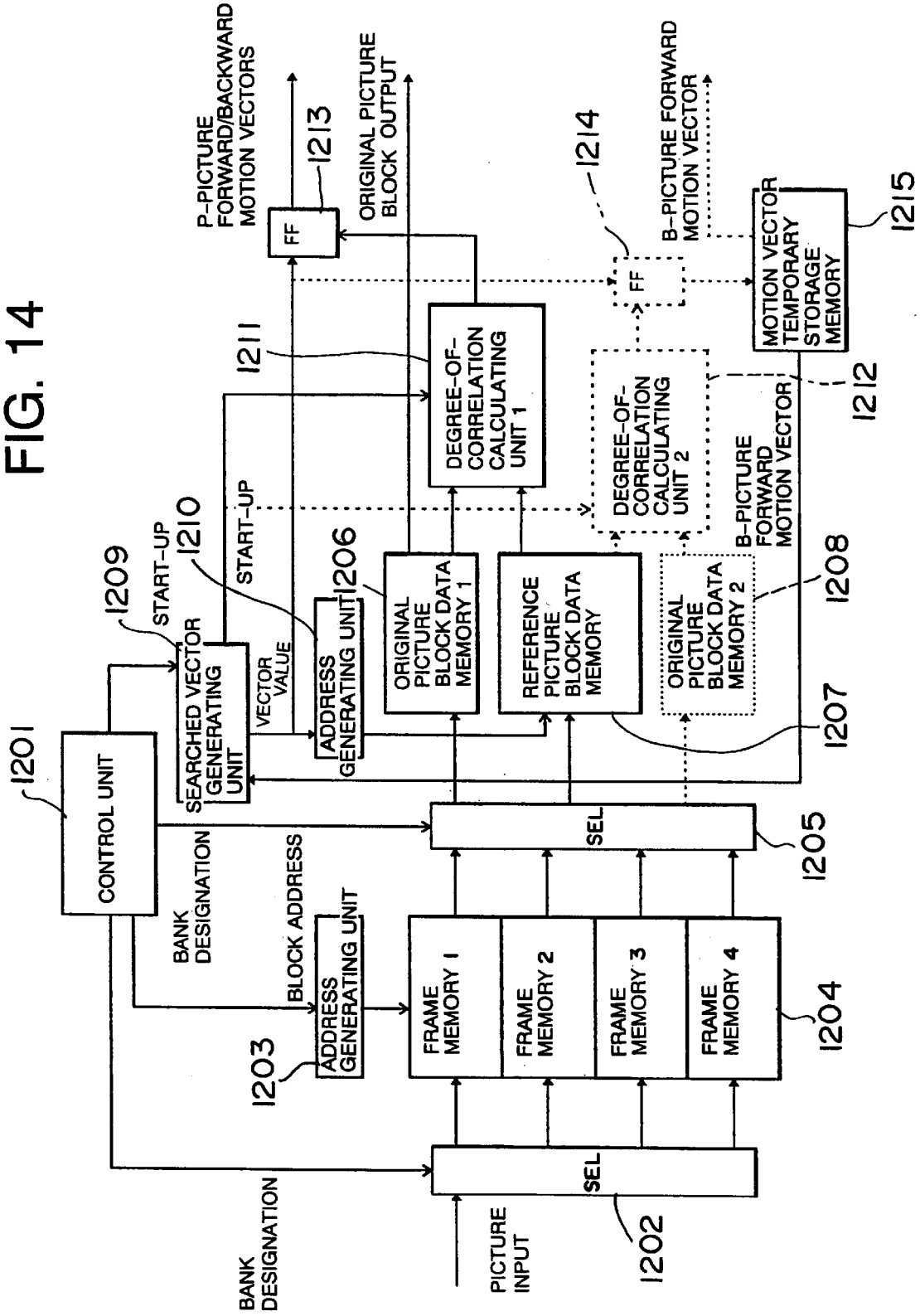
FIG. 14 is a functional block diagram of the motion searching unit in an embodiment 2 of the present invention.

FIG. 14 is a diagram illustrating a construction of a second embodiment of the present invention.

The construction of the present apparatus is substantially the same as that in the embodiment 1 discussed referring to FIG. 12. However, the original picture block data memory 1208, the degree-of-correlation calculating unit 1212 and the flip-flop 1214 (which are all indicated by the broken lines), are omitted. Other structures are the same as those in FIG. 12, and therefore their explanations are omitted.

Referring to FIG. 14, the pixel data of the area to be coded is at first transferred to the original picture block data memory 1206 from the frame memory 1204. Corresponding to this transfer, the pixel data of the frame serving as a forward reference target are transferred to the reference picture block data memory 1207. At this time, however, the motion vector temporary storage memory 1215 refers to the forward motion vector of the B-picture in the area existing in the same position obtained just before it, and, this being criterion, the searched vector generating unit 1209 determines a search area.

Thereafter, as the same way with the conventional system shown in the embodiment 1, in response to the signal from the control unit 1201, the reference picture block data memory 1207 transmits the data of the area having the same size as the original block size to the degree-of-correlation calculating unit 1211, wherein a degree of correlation is calculated.

After this calculation onward, the reference picture block data memory 1207 transmits the block pictures shifted pixelwise in parallel in the horizontal or vertical direction in accordance with a designation of the address calculated from a virtual vector value outputted from the searched vector generating unit 1209, and a degree of correlation is calculated each time. Then, a deviation from a position exhibiting a highest correlation in the end with respect to all the reference picture blocks, is outputted as a motion vector to the coding unit via the flip-flop 1213.

It is apparent that, in this invention, a wide range of different working modes can be formed based on the invention without deviating from the spirit and scope of the invention. This invention is not restricted by its specific working modes except being limited by the appended claims.

What is claimed is:

1. A motion vector searching apparatus, comprising:

a frame memory, having at least an area, for storing picture data about an original picture and a reference picture;

control means for controlling said frame memory on the basis of external predictive system data and determining a motion vector between the pictures by obtaining a degree of correlation between the original picture and the reference picture; and motion vector data storage means for storing motion vector data, wherein said control means, when searching a motion vector in an arbitrary area of a designated picture, and if said frame memory includes an area within an unprocessed picture with the same area being referred to as an area within a reference picture to which the designated picture refers, simultaneously performs the motion vector search with respect to this area, said control means directs said vector data storage means to store vector data of the area with respect to a prospective picture among pieces of the obtained motion vector data, and said control means, if there is the vector data obtained in the past about the area of the present picture exists, outputs the motion vector of the designated area in addition to the obtained motion vector data.

2. A motion vector searching apparatus according to claim 1, wherein when obtaining a forward motion vector in the arbitrary area within the designated picture, and if a picture with a prediction effected using the same reference picture in the past and said vector data storage means is stored with the forward motion vector, this forward motion vector is read, and a forward motion vector search is executed based on coordinates indicated by that motion vector.

3. A motion vector searching apparatus, comprises:

a frame memory, having at least an area, for storing picture data about an original picture and a reference picture;

control means for controlling said frame memory based on external predictive system data and determining an inter-picture motion vector by obtaining a degree of correlation between the original picture and the reference picture; and motion vector data storage means for storing the motion vector data determined by said control means, wherein said control means, when searching a backward motion vector in an arbitrary area of a designated bidirectional predictive picture, and if said frame memory includes an area within an unprocessed bidirectional predictive picture that is to refer forward to the same area as an intra reference picture area to which the intra bidirectional predictive picture area refers backward, simultaneously performs the forward motion vector search with respect to this area, said control means directs said motion vector data storage means to store the obtained forward motion vector data, and outputs the motion vector of the obtained backward motion vector data and the forward motion vector data already obtained in the past.

4. A motion vector searching apparatus according to claim 3, wherein said control means, when there is a picture with a prediction effected using the same reference picture in the past, and if said motion vector data storage means is stored with the forward motion vector thereof, reads the forward motion vector therefrom and performs a forward motion vector search of a forward predictive picture on the basis of coordinates indicated by the motion vector.

5. A motion picture coding apparatus for coding a difference between a selected predictive picture and an original picture, comprising:

means for inputting a forward motion vector and a backward motion vector, and forming a forward reference picture and a backward reference picture for local decode pictures by use of the forward and backward motion vectors;

means for selecting a reference picture from the forward or backward reference picture as predictive picture most approximate to an original picture, means for quantizing and reversely quantizing difference data between the predictive picture and the original picture; and means for storing the reversely-quantized data as local decode picture data.

6. A motion picture coding apparatus according to claim 5, wherein a picture having a smaller pixel difference absolute value sum in pixels between the reference pictures and the original picture is picked up as a predictive picture.

7. A motion vector search apparatus, comprising:

a frame memory having at least an area for storing picture data about an original picture and a reference picture;

control means for controlling said frame memory on the basis of external predictive system data and determining a motion vector between the pictures by obtaining a degree of correlation between the original picture and the reference picture; and motion vector data storage means for storing motion vector data, wherein said control means, when searching a motion vector in an arbitrary area of a designated picture, and if said frame memory includes an area within an unprocessed picture with the same area being referred to as an area within a reference picture to which the designated picture refers, simultaneously performs the motion vector search with respect to this area, said control means directs said vector data storage means to store vector data of the area with respect to a prospective picture among pieces of the obtained motion vector data, and said control means, if a picture with a prediction effected using the same reference picture in the past and said vector data storage means is stored with the forward motion vector, this forward motion vector is read, and a forward motion vector search is executed based on coordinates indicated by that motion vector.

* * * * *